US008807763B2

(12) United States Patent
Takahashi et al.

(10) Patent No.: US 8,807,763 B2
(45) Date of Patent: Aug. 19, 2014

(54) IMAGE PROJECTION APPARATUS

(75) Inventors: Tatsuya Takahashi, Kanagawa (JP); Kazuhiro Fujita, Tokyo (JP); Issei Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 246 days.

(21) Appl. No.: 13/411,717

(22) Filed: Mar. 5, 2012

(65) Prior Publication Data

US 2012/0236266 A1  Sep. 20, 2012

(30) Foreign Application Priority Data

Mar. 15, 2011  (JP) ................................. 2011-057147
Oct. 27, 2011  (JP) ................................. 2011-236011

(51) Int. Cl.
*G03B 21/14* (2006.01)

(52) U.S. Cl.
USPC ................................ 353/70; 353/101; 353/98

(58) Field of Classification Search
USPC ............ 353/46, 50, 51, 69, 70, 77, 78, 79, 98, 353/99
See application file for complete search history.

(56) References Cited

U.S. PATENT DOCUMENTS

| 6,099,128 | A * | 8/2000 | Jessl ................................ 353/51 |
| 6,431,711 | B1 * | 8/2002 | Pinhanez ......................... 353/69 |
| 6,652,104 | B2 * | 11/2003 | Nishida et al. .................. 353/70 |
| 6,877,862 | B2 * | 4/2005 | Fukunaga et al. .............. 353/70 |
| 7,871,167 | B2 * | 1/2011 | Amano et al. .................. 353/70 |
| 2002/0122161 | A1 | 9/2002 | Nishida et al. |
| 2006/0126028 | A1 * | 6/2006 | Ullman ............................ 353/69 |
| 2009/0040472 | A1 * | 2/2009 | Wakita ............................ 353/69 |
| 2011/0038039 | A1 | 2/2011 | Takaura et al. |

FOREIGN PATENT DOCUMENTS

| CN | 101017313 A | 8/2007 |
| CN | 101271251 A | 9/2008 |
| CN | 101363957 A | 2/2009 |
| JP | 2003-149732 | 5/2003 |
| JP | 2010-122573 | 6/2010 |
| JP | 2010-197837 | 9/2010 |

OTHER PUBLICATIONS

Combined Chinese Office Action and Search Report issued Mar. 5, 2014, in Chinese Patent Application No. 201210042885.2 with English translation of category of cited documents.

* cited by examiner

*Primary Examiner* — William C Dowling
(74) *Attorney, Agent, or Firm* — Oblon, Spivak, McClelland, Maier & Neustadt, L.L.P.

(57) ABSTRACT

An image projection apparatus includes: an optical image generating unit to generate an optical image based on image data; a projection surface; a projection optical system including a plurality of optical elements and configured to form an projected image, onto a projection surface, coupled with the optical image generated by the optical image generating unit; a projected image shifting unit to shift the projected image by changing a posture of at least one of the plurality of optical elements included in the projection optical system; a tilt sensor to detect a posture of the optical element of which posture is changed by the projected image shifting unit; and a trapezoidal distortion correction unit to correct the optical image generated by the optical image generating unit so as to prevent the trapezoidal distortion of the projected image from occurring based on the detection result of the tilt sensor.

6 Claims, 9 Drawing Sheets

IMAGE PROJECTION APPARATUS

CROSS-REFERENCE TO RELATED APPLICATIONS

The present application claims priority from Japanese patent application numbers 2011-057147 and 2011-236011, filed on Mar. 15, 2011 and Oct. 27, 2011, respectively, the entire contents of which are incorporated by reference herein.

BACKGROUND OF THE INVENTION

1. Field of the Invention

The present invention relates to an image projection apparatus or a projector capable of correcting a trapezoidal distortion of a projected image.

2. Description of the Related Art

An image projection apparatus including an optical image generating unit to generate an optical image and a projection optical system that includes a first optical system including a plurality of lenses and a second optical system formed of a concave mirror, is conventionally known. In this image projection apparatus, the first optical system forms an intermediate optical image, between the first and second optical systems, coupled with the optical image formed in the optical image generating unit, and the second optical system projects the image coupled with the intermediate optical image onto a projection surface such as a screen. When a vertical position of the projected image formed on the projection surface needs to be adjusted, the second optical system is rotated so as to change a posture of the second optical system, whereby the projected image is shifted in a vertical direction and the position of the projected image is adjusted. However, when the posture of the second optical system is changed and the projected image is vertically shifted, a so-called trapezoidal distortion, in which the projected image is distorted in a shape of the trapezoid, occurs to the projected image.

JP-2010-197837-A discloses an image projection apparatus configured to correct the trapezoidal distortion by accommodating a polarization element between the second optical system and the projection surface. The projected image is formed on the projection surface from the second optical system via the polarization element and the corrected image is formed by adjusting the polarization angle of the polarization element.

However, the above technique requires provision of additional optical parts such as the polarization element to correct the trapezoidal distortion and an additional mechanism to drive those optical parts, thereby increasing the number of parts and increasing the cost of manufacturing the apparatus. In addition, there is a problem that the size of the final product increases as the number of parts increases.

BRIEF SUMMARY OF THE INVENTION

The present invention was made to solve the above problem and provides an image projection apparatus capable of correcting the trapezoidal distortion while preventing both the cost and size of the apparatus from increasing.

In particular, the present invention provides an image projection apparatus or a projector including an optical image generating unit to generate an optical image based on image data, a projection optical system including a plurality of optical parts and configured to form, onto a projection surface, a projected image coupled with the optical image formed by the optical image generating unit, and a projected image shifting unit to shift the projected image by changing a posture of at least one of the optical parts that form the projection optical system. The projector further includes a tilt sensor configured to detect a posture of the optical parts that change the posture by the projected image shifting unit, and an image processor to perform correction of the optical image that the optical image generating unit generates, based on the detection result of the tilt sensor so as to prevent a trapezoidal distortion of the projected image.

According to the present invention, the projected image shifting unit changes a posture of the optical parts, and the image processor corrects the optical image that the optical image generating unit generates, based on the changed posture of the optical parts, thereby correcting the trapezoidal distortion of the projected image. There is a correlation between a change amount of the posture of the optical parts and a shifted amount of the projected image and there is also a correlation between the shifted amount of the projected image and the trapezoidal distortion amount of the projected image. Accordingly, by obtaining the posture of the optical parts, an amount of the trapezoidal distortion of the projected image can be obtained and, by correcting the optical image based on the posture of the optical parts, the trapezoidal distortion of the projected image can be corrected.

These and other objects, features, and advantages of the present invention will become more readily apparent upon consideration of the following description of the preferred embodiments of the present invention when taken in conjunction with the accompanying drawings.

BRIEF DESCRIPTION OF THE DRAWINGS

FIG. 4A shows an optical path in which a second optical system is in an original posture, and FIG. 4B shows an optical path in which the second optical system is rotated;

DETAILED DESCRIPTION OF THE INVENTION

An embodiment of a projector as an image projection apparatus to which the present invention is applied will now be described.

Figure 1:
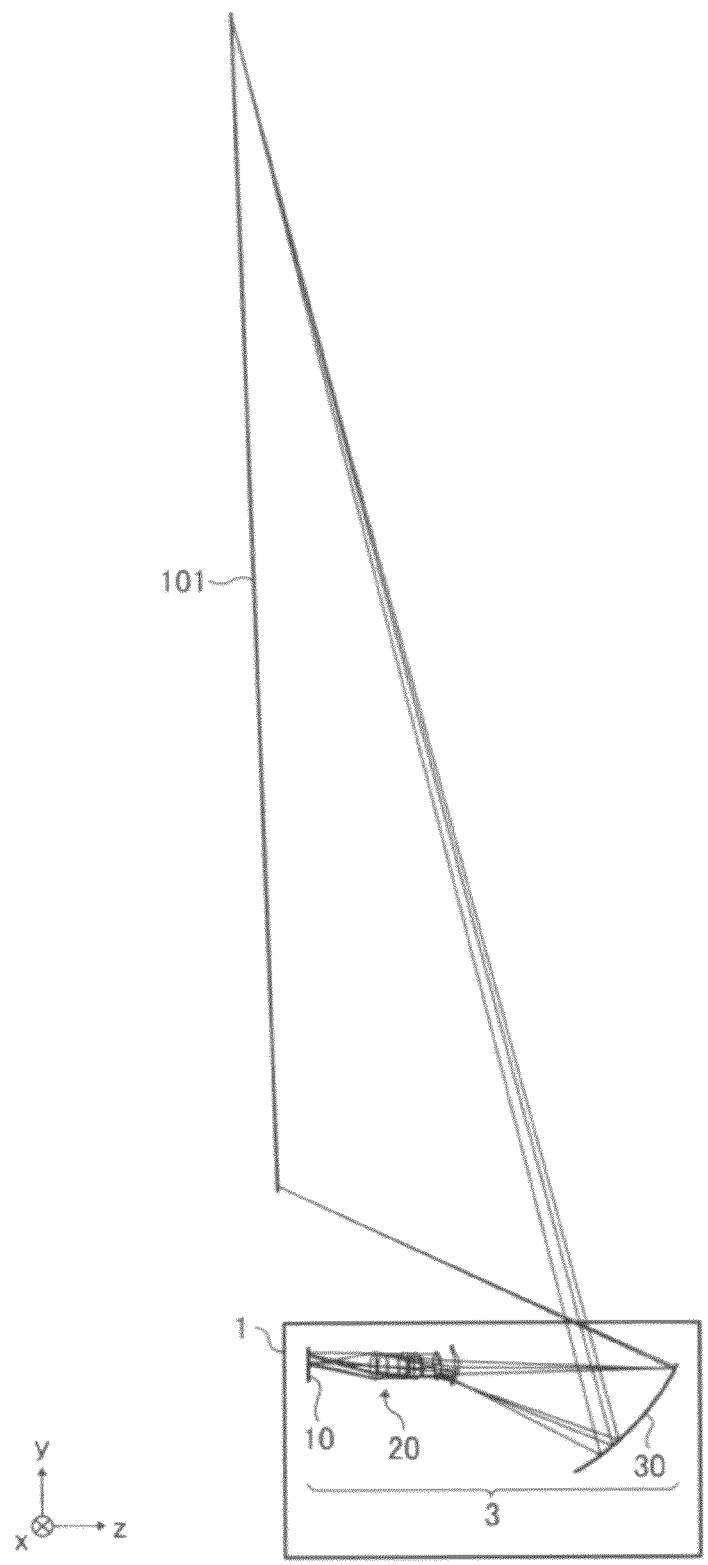
FIG. 1 shows an optical path from a projector to a projection surface according to an embodiment of the present invention.
Figure 2:
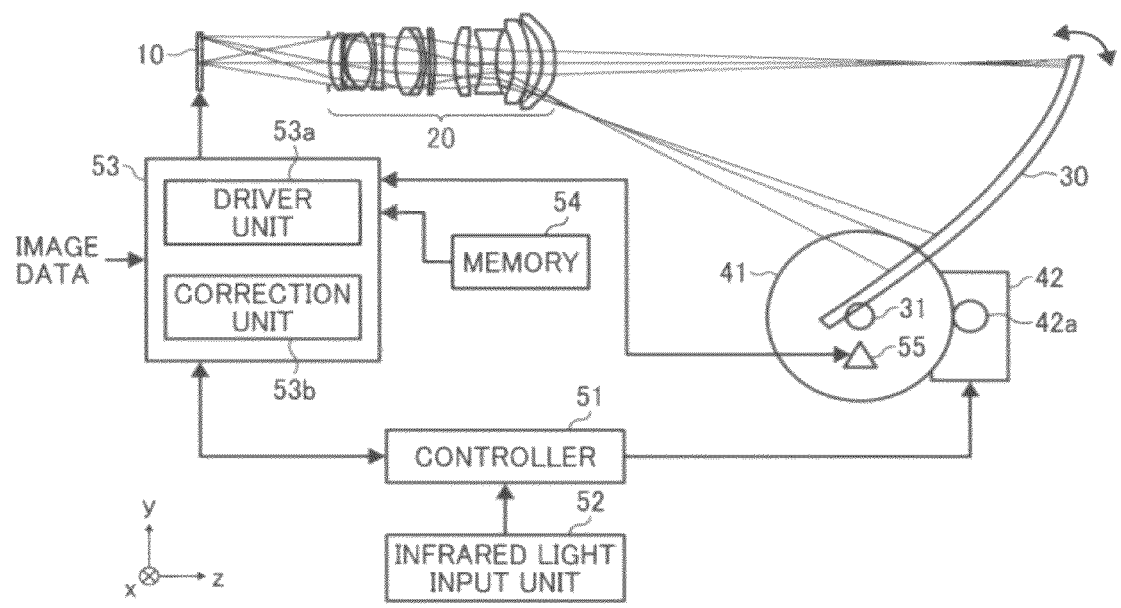
FIG. 2 is a schematic view illustrating a structure of the projector in FIG. 1.

FIG. 1 shows an optical path from a projector 1 to a projection surface 101 according to an embodiment of the present invention and FIG. 2 shows a schematic view illustrating the projector 1. Herein, a long axis of the projection surface 101 is set as x, a short axis thereof is y, and a normal direction thereto is z.

As illustrated in FIGS. 1 and 2, the projector 1 includes an image generating unit 10 and a projection optical system 3 to project an image generated by the image generating unit 10. The projection optical system 3 includes at least one refracting optical system, a coaxial first optical system 20 having positive power, and a second optical system 30 with at least one reflection surface having positive power.

The image generating unit 10 includes a plurality of image generating elements (for example, liquid crystal devices) and may employ transmissive or reflective dot matrix liquid crystal or digital micro mirror device (DMD) including an image forming unit (for example, a liquid crystal panel) to generate an image in accordance with modulated signals, a light source to irradiate the image forming unit, and the like. Specifically, light emitted from the light source is separated into red (R), green (G), and blue (B) color components by the plurality of optical parts and the separated light strikes a plurality of image forming elements disposed corresponding to each RGB color. In a driver unit 53a of an image processor 53, modulated signals are generated based on image data input from a PC or the like, are input into each of the plurality of image forming elements, and the input signal is subjected to optical modulation at each image forming element in accordance with the image data. Thereafter, the optically modulated signal is synthesized by a known synthesizing unit such as a dichroic prism, and is emitted toward the first optical system 20 as an image light.

The projection optical system 3 includes the first optical system 20 and the second optical system 30. The first optical system 20 includes plural optical parts and forms an intermediate image between the first optical system 20 and the second optical system 30, coupled with an optical image formed in the image generating unit 10. This intermediate image is focused as a curved surface image between the first optical system 20 and the second optical system 30.

The second optical system 30 is formed of a concave mirror and projects a further enlarged image of the intermediate image onto the projection surface 101. By configuring the projection optical system 3 as above, the projection length of the projector is shortened and the projector can be used even in small meeting rooms. Further, a problem of the shadow of a presenter entering between the projected image and the projector 1 frequent in the conventional projector can be eliminated.

Figure 3:
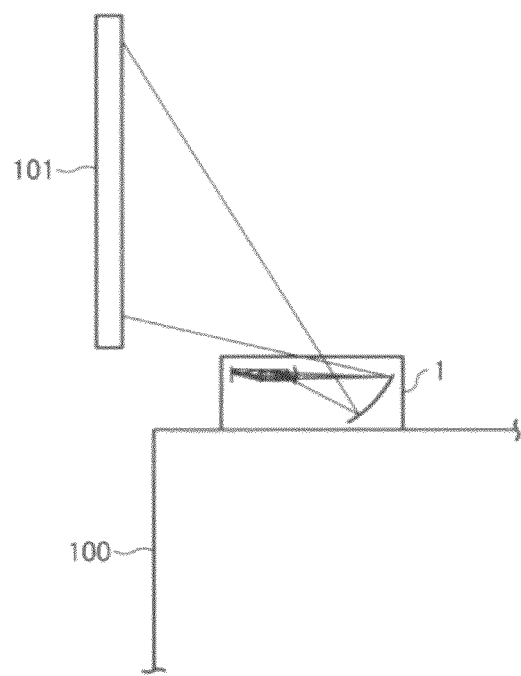
FIG. 3 is a view illustrating a scene in which the projector in FIG. 2 is used.

As illustrated in FIG. 3, the projector 1 according to the embodiment of the present invention used in the meeting room, for example, is used in such a manner that the projector 1 is placed on a table 100 and an image from the projector 1 is projected onto the projection surface 101 such as a whiteboard. In this case, a height of the projection surface 101 and that of the table on which the projector 1 is placed are fixed. When an entire image cannot be projected onto the projection surface 101 in this state, another table needs to be prepared to adjust the height of the projected image, which is very troublesome. However, if the projector 1 has the capability to adjust the height of the projection surface 101, such trouble does not occur and it is more user-friendly.

In the present embodiment, the second optical system 30 is rotatable in x-direction, and the position of the height (y-direction) of the projected image can be adjustable by rotating the second optical system 30 in the x-direction. Specifically, as illustrated in FIG. 2, the second optical system 30 is fixed to a rotary shaft 31 extending in the x-direction to which a gear 41 is fixed at one end of the second optical system 30. The gear 41 engages a motor gear 42a of a motor 42. By driving the motor 42, the second optical system 30 rotates clockwise or counterclockwise as illustrated in FIG. 2, the projected image shifts in the y-direction, and the position of the projected image is adjusted. As illustrated in FIG. 2, the projector 1 also includes an infrared light input unit 52. When a user operates the infrared light input unit 52 via a remote controller, not shown, an infrared light signal is emitted from the remote controller and is input to the infrared light input unit 52 of the projector 1. When the infrared light input unit 52 receives the infrared light signal, a controller 51 drives the motor 42 to rotate the second optical system 30 clockwise or counterclockwise in the figure and the position of the projected image in the y-direction is adjusted. In the present embodiment, the second optical system 30 is rotated by the gear 41 and the motor 42, but the present embodiment is not limited to this and other known methods may be used to rotate the second optical system 30. The second optical system 30 may be rotated manually by a user who rotates the gear 41, thereby rotating the second optical system 30.

Figure 4A:
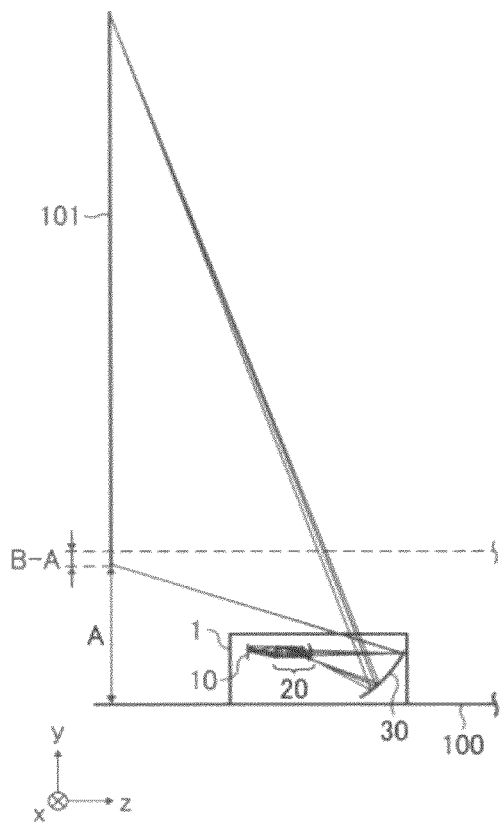
FIGS. 4A and 4B each show an optical path.
Figure 4B:
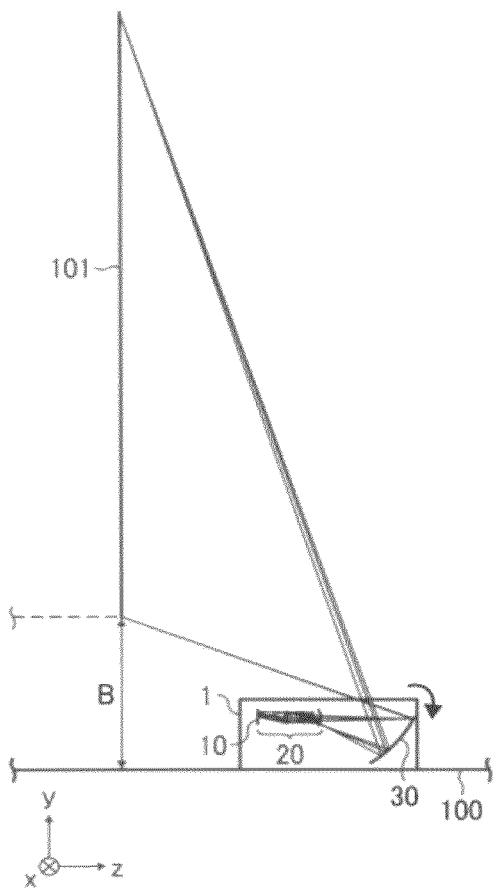

FIG. 4A shows an optical path in which the second optical system 30 is in an original posture, and FIG. 4B shows an optical path in which the second optical system 30 is rotated clockwise in the figure.

As illustrated in FIG. 4A, when the second optical system 30 is in the original posture, the projected image is projected at an original position of the projection surface 101. As illustrated in FIG. 4B, when the second optical system 30 is rotated clockwise in the figure from the original posture, the projected image shifts in the +y-direction (that is, an upward direction). With this operation, the height of the projected image from the table 100 changes from A to B. Instead, when the second optical system 30 is rotated counterclockwise in the figure from the original posture, the projected image shifts in the −y-direction.

When the projected image is shifted in the y-direction by rotating the second optical system 30, an incidence angle and a projection distance of the light incident to the projection surface 101 change before and after the shifting of the projected image, and the projected image gets out of focus. Because as the projection distance of the projector 1 becomes shorter, the incidence angle of the light onto the projection surface 101 becomes greater, this out-of-focus becomes remarkable. However, in the present embodiment, because the second optical system 30 has positive power as a concave mirror, the out-of-focus problem can be solved by appropriately designing the second optical system 30, thereby maintaining the resolution or focus and shifting the image properly. A surface that reflects the light from the second optical system 30 may be spherical, rotationally symmetric aspherical, or free-form. An example of a polynomial of a free-form shape is represented as follows:

$$Z = X2xx^2 + Y2xy^2 + X2Yxx^2y + Y3xy^3 + X4xx + X2Y2xx^2y^2 + Y4xy^4 + X4Yxx^4y + X2Y3xx^2y^3 + Y5xy^5 + X6xx^6 + X4Y2xx^4y^2 + X2Y4xx^2y^4 + Y6xy^6 + \ldots$$

In the above polynomial, the vertical direction is y-direction, the lateral direction is x-direction, and the depth of the curved surface is z-direction with the projected image set as an origin, and X2, Y2, X2Y, Y3, X2Y2, and the like are coefficients. Because design flexibility is enhanced as the shape of the second optical system 30 becomes more flexible, the second optical system 30 is formed to have a free-form surface, thereby increasing a shift amount of the projected image to maintain the resolution of the image.

Further, when the second optical system 30 is rotated in the x-direction, the second optical system 30 is also allowed to rotate in the y-direction. When the second optical system 30 is rotated in the y-direction, the projected image can be shifted to the y-direction while preventing focusing error. In addition, because flexibility in designing the curved shape of the second optical system 30 to maintain the resolution increases by combining the curved shape of the second optical system 30 and shifting of the second optical system 30 in the y-direction, the shifted amount of the projected image can be increased while maintaining the resolution. Shifting of the second optical system 30 in the y-direction is preferably performed while rotating it. In the present embodiment, a frame is provided in which a rotary shaft 31 to which the second optical system 30 and the gear 41 is fixed, the motor 42, and a tilt sensor 55 (to be described later) are formed as a single integrated unit and supported by the frame. Therefore, the second optical system 30 is configured to be shifted in the y-direction integrally by the frame.

In addition, alternatively, when the projected image is moved to the y-direction, it is possible to maintain the resolution by shifting at least one of the optical parts of the first optical system 20.

Figure 5:
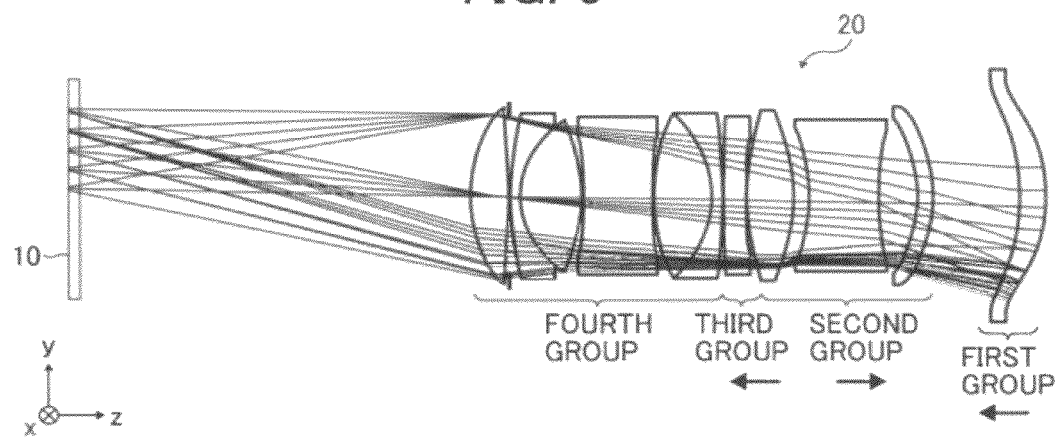
FIG. 5 is a schematic view of a first optical system.

FIG. 5 is a schematic view of the first optical system 20, shown divided into four groups. When the projected image is shifted in the +y-direction, a first group of the first optical system 20 is moved to −z-direction, a second group thereof to +z-direction, and a third group thereof to −z-direction while rotating the second optical system 30. With this operation, while maintaining the resolution, the projected image is shifted to the +y-direction.

Next, a description will be given of a structure of the image projection apparatus according to the present embodiment.

In the present embodiment, as described above, the projected image can be shifted while maintaining the resolution. However, when the second optical system 30 is rotated from the original posture so as to shift the projected image, a distance from the second optical system 30 to the projection surface 101 changes, thereby generating trapezoidal distortion. When the image shift amount is small, the trapezoidal distortion can be prevented by optimizing the curved surface of the second optical system 30. However, when the image shift amount is large, optimization of the curved surface of the second optical system 30 alone is not enough to prevent the trapezoidal distortion.

Figure 6A:
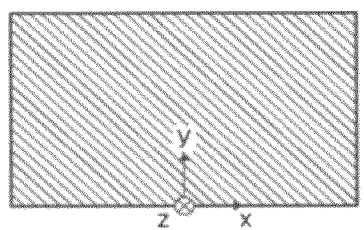
FIGS. 6A and 6B are views illustrating a relation between an image generated by an image generating unit and a projected image projected onto a projection surface.
Figure 6B:
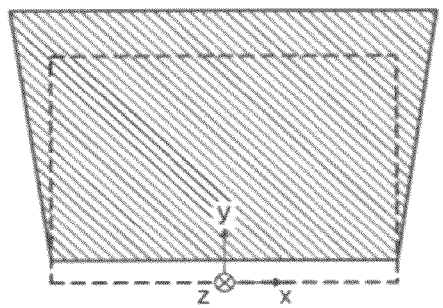

FIGS. 6A and 6B are views illustrating a relation between an image generated by the image generating unit 10 and the projected image projected onto the projection surface 101. FIG. 6A shows an image formed by the image generating unit 10 and FIG. 6B shows a projected image formed on the projection surface 101.

When the second optical system 30 is in the original posture, an enlarged projected image with a same aspect ratio as that of the generated image is projected onto the projection surface 101 as illustrated in FIG. 4B by a broken line. By contrast, when the second optical system 30 is rotated to shift the projected image in the +y-direction, a trapezoidal distortion occurs as illustrated in FIG. 6B.

Then, in the present embodiment, the trapezoidal distortion of the projected image is corrected by correcting the input image. How to correct the trapezoidal distortion will now be described in detail.

The projector 1 according to the present embodiment includes an image processor 53 (see FIG. 2) as a trapezoidal distortion correction unit to correct the input image. A tilt sensor 55 to detect inclination of the second optical system 30 and a memory 54 are connected to the image processor 53. The memory 54 stores a table including inclination or tilt angles of the second optical system 30 and image correction coefficients associated with the tilt angles. The image processor 53 recognizes the image correction coefficient from the detection result of the tilt sensor 55 and the table stored in the memory 54, and corrects the input image based on the recognized image correction coefficient. The image processor 53 then transmits the corrected input image to the image generating unit 10.

The tilt sensor 55 serving as a posture detection unit may employ a potentiometer. The potentiometer is mounted to the rotary shaft 31 so as to read a resistance varying in proportion to the inclination of the potentiometer and from that varying resistance detect the inclined angle. Alternatively, the tilt sensor 55 may employ an acceleration sensor. When the acceleration sensor is used, the acceleration sensor detects a gravitational acceleration G and the inclined angle can be obtained from the sinusoidal function of the gravitational acceleration G. It is to be noted that the tilt sensor 55 may employ other known methods without limitation to the methods described above.

Figure 7A:
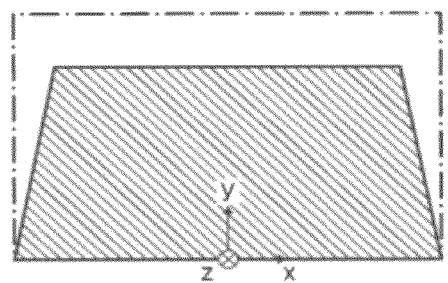
FIG. 7A shows an image displayed on the image generating unit of the image corrected by an image processor.
Figure 7B:
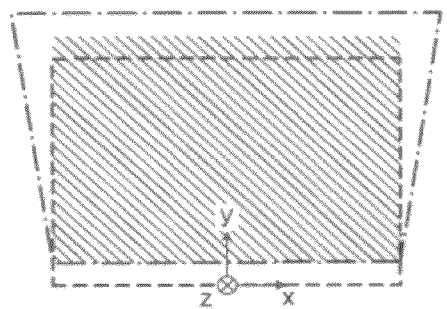
FIG. 7B shows a projected image of the image subjected to trapezoidal distortion correction.

FIG. 7A shows an image generated by the image generating unit 10 from the image corrected by a correction unit 53b of the image processor 53. FIG. 7B shows a projected image after being subjected to the trapezoidal distortion correction. The dot-dashed line of FIG. 7A shows a case in which the image not corrected by the correction unit 53b of the image processor 53 is generated by the image generating unit 10. The dot-dashed line of FIG. 7B shows a projected image before the trapezoidal distortion correction. The dashed line of FIG. 7B shows a projected image when the second optical system 30 is in an original posture.

The image data input from the correction unit 53b of the image processor 53 is corrected into an inverted trapezoidal shape from the trapezoidal shape of the projected image before the trapezoidal distortion correction as illustrated by the dot-dashed line of FIG. 7B. The correction unit 53b of the image processor 53 thins out pixels of the image data based on the detection result of the tilt sensor 55, performs interpolation after thinning and generates corrected image data. The driver unit 53a inputs modulated signals to each of the image forming elements of the image generating unit 10 based on the corrected image data, and a corrected image is generated in the image generating unit 10. As recognized by comparing the dashed line and the dot-dashed line in FIG. 7B, the projected image with trapezoidal distortion expands in the x- and y-directions as the projected image expands upward in the +y-direction. Therefore, the correction unit 53b of the image processor 53 thins out the pixels of the image data in the x-direction based on a predetermined algorithm, thereby correcting a height of the input image in the y-direction. With this operation, the distortion of the projected image in the y-direction is corrected so that the length of the projected image after correction in the y-direction becomes identical to the length of the projected image in the original posture as illustrated by the dashed line in FIG. 7B. Subsequently, several pixels are thinned from the plurality of pixels remaining in the x-direction without being thinned, based on each position in the y-direction after correction and the predetermined algorithm. With this operation, the image data is corrected so that the inverted trapezoidal shape of the projected image turns into a normal trapezoidal shape. With this operation, the aspect ratio of the projected image after correction (see FIG. 7B) can be identical to that of the projected image of the original posture as indicated by the dashed line.

Thinning in the x-direction to correct the length in the y-direction according to the present embodiment is performed with a base position set at an upstream end in the shifting direction of the projected image generated from the image data (i.e., a bottom end in the figure). This is referred to as "Case 1" later in the description. Specifically, the bottom end of the generated image after correction and the bottom end of the generated image before correction are made identical to each other. By setting the bottom end as the base position, the amount of pixels thinned based on the position in the y-direction when the input image is made into a trapezoidal shape can be decreased compared to the case in which an upper end is set as the base position. The latter is referred to as "Case 2" later in the description. As a result, deterioration of the resolution of the projected image after correction in the x-direction can be prevented.

In the above description, an explanation was given of a case in which the image shifting direction is the +y-direction. By contrast, when the image is shifted in the −y-direction, the upstream end in the shifting direction of the projected image becomes an upper end of the image. In this case, the upper end of the image is set as a base position and the input image is corrected. Therefore, the correction unit 53b of the image processor 53 thins out the pixels of the input image based on a predetermined algorithm so that the image data is corrected to be a trapezoidal shape as illustrated in FIG. 7A and the trapezoidal distortion of the projected image is corrected as illustrated in FIG. 7B.

In addition, although in the above description the correction of the distortion of the projected image in the y-direction is performed by setting the upstream end in the shifting direction of the projected image of the image data as the base position, alternatively, the correction can be performed by setting a downstream end in the shifting direction of the projected image of the image data as the base position.

Figure 8A:
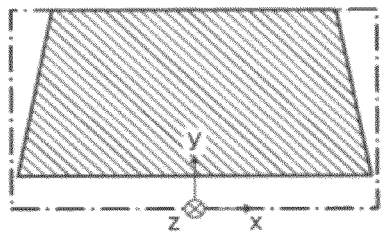
FIGS. 8A and 8B show a generated image and a projected image, respectively, when an input image has been corrected with a downstream end of the projected image in the shifting direction set as a base position.
Figure 8B:
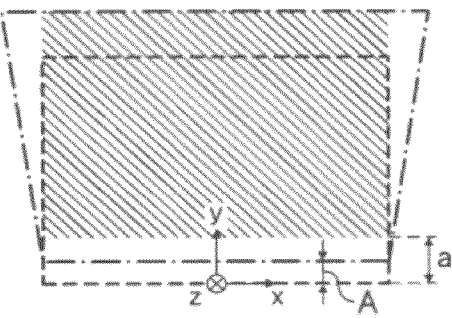

FIGS. 8A and 8B show a generated image and a projected image respectively when the image data is corrected with the downstream end in the shifting direction of the projected image of the image data set as the base position.

Referring to FIGS. 8A and 8B, a case in which the projected image is shifted in the +y-direction will now be described.

As illustrated in FIG. 8A, the downstream end in the shifting direction of the projected image when the projected image is shifted in the +y-direction corresponds to an upper side in the figure. In this operation, as illustrated in FIG. 8A, the bottom end of the generated image after correction shifts in the +y-direction compared to the bottom end of the generated image before correction indicated by a dot-dashed line in FIG. 8A. As a result, the projected image after correction can be shifted toward the +y-direction compared to the projected image after correction with the upstream end in the shifting direction of the projected image of the input image set as the based position (see FIGS. 7B and 8B). Specifically, when the downstream end in the shifting direction of the projected image of the image data is set as the base position, the shifted amount of the projected image relative to the rotation amount of the second optical system 30 can be magnified. Similarly, when the shifted amount of the projected image is identical, the rotation amount (or posture change amount) of the second optical system 30 can be lessened compared to the case in which the upstream end in the shifting direction of the projected image of the image data is set as the base position. Furthermore, the number of thinned pixels of the image in the x-direction can be reduced compared to the case in which the upstream end in the shifting direction of the projected image of the image data is set as the base position, and the deterioration of the resolution of the projected image in the y-direction can be prevented. In addition, because the rotation amount (or posture change amount) of the second optical system 30 can be lessened, as a result, the deterioration of the resolution in the projected image in the x-direction can be minimized.

Whether the base position is set to be the upstream end or the downstream end in the shifted direction of the projected image is selected as appropriate according to the structure of the apparatus. When the distortion in the x-direction is greater than that in the y-direction when the projected image is shifted in the y-direction, it is preferred that the base position is set to be the upstream end in the shifting direction of the projected image, thereby suppressing the deterioration of the resolution effectively. Contrarily, when the distortion in the y-direction is greater, it is preferred that the base position is set to be the downstream end in the shifting direction of the projected image, thereby effectively suppressing the deterioration of the resolution.

In the aforementioned description, a case in which the projected image is shifted in the y-direction is considered; however, by configuring the second optical system 30 to be rotatable in the y-direction, the image can be shifted in the ±x-direction. In addition, in the above description, the image correction coefficient relative to the inclination of the second optical system 30 is specified based on the listings in the table. However, the image correction coefficient can be obtained by operations using arithmetic expressions.

The present invention will be more clearly explained based on preferred embodiments.

First Embodiment

The image generating unit 10 of a projector according to a first embodiment has a width of 0.64 inches and an aspect ratio of 16:10, and a magnification ratio of the projector is 94× the width of the image generating unit 10. Herein, the magnification ratio means a substantial proportion of the image generated in the image generating unit 10 with respect to the size of the projected image projected onto the projection surface 101. Further, the f-number of the projector is f/2.5. Table 2 below shows various elements of the projector 1 according to the first embodiment.

TABLE 1

| Surface Number | Surface Shape | Curvature Radius | Distance between Surfaces | Refraction Index | Dispersion | Shift | Tilt |
|---|---|---|---|---|---|---|---|
| 0 | Spheric | ∞ | 1.11 | | | | |
| 1 | Spheric | ∞ | 1.05 | 1.51 | 63.35 | | |
| 2 | Spheric | ∞ | 39.97 | | | | |
| 3 | Aspheric | 20.05 | 3.92 | 1.51 | 63.90 | −1.39 | |
| 4 | Aspheric | −58.99 | 0.10 | | | | |
| 5 | Spheric | ∞ | 0.10 | | | | |
| 6 | Spheric | 36.73 | 1.00 | 1.84 | 40.59 | | |
| 7 | Spheric | 11.27 | 6.28 | 1.49 | 69.98 | | |
| 8 | Spheric | −23.49 | 0.10 | | | | |
| 9 | Spheric | −88.06 | 7.00 | 1.84 | 35.72 | | |
| 10 | Spheric | 44.82 | 0.10 | | | | |
| 11 | Spheric | 21.80 | 6.00 | 1.57 | 41.56 | | |
| 12 | Spheric | −13.95 | 1.00 | 1.84 | 42.98 | | |
| 13 | Spheric | −107.29 | 0.16 | | | | |
| 14 | Spheric | 131.27 | 2.28 | 1.72 | 52.53 | | |
| 15 | Spheric | 58.01 | 0.10 | | | | |
| 16 | Spheric | 30.90 | 4.73 | 1.70 | 29.04 | | |
| 17 | Spheric | −26.63 | 1.62 | | | | |
| 18 | Spheric | −24.77 | 7.00 | 1.84 | 32.80 | | |
| 19 | Spheric | 28.19 | 4.07 | | | | |
| 20 | Aspheric | −17.22 | 1.60 | 1.53 | 55.80 | | |
| 21 | Aspheric | −22.10 | 8.83 | | | | |
| 22 | Aspheric | −46.46 | 2.70 | 1.53 | 55.80 | | |
| 23 | Aspheric | −26.53 | 0.20 | | | | |
| 24 | Spheric | ∞ | 90.00 | | | | |
| 25 | xy-polynomial surface | −81.45 | −374.21 | Reflection | | −32.11 | −39.07 |
| 26 | Spheric | ∞ | 0.00 | | | | |

Surface numbers in Table 1 show each surface which is numbered sequentially in an order through which an optical image is transmitted. The surface numbered 0 is an image generating surface of the image generating unit 10 and the surface numbered 26 is the projection surface 101. For example, the surface number 1 is an incidence plane to which the optical image is incident of a transmitting glass disposed opposite the image generating surface of the image generating unit 10. The surface number 2 shows an emission plane of the optical image of the transmitting glass. The surface numbers 5 and 24 are dummies. The one with a spherical surface and an infinite curvature radius is a plane. The surface numbers 3 to 23 show either the incidence plane or the emission plane of each lens included in the first optical system 20. The surface numbers 14 and 15 show lenses of the third group as illustrated in FIG. 5. The surface numbers 16 to 21 represent lenses of the second group and the surface numbers 22 and 23 represent lenses of the first group as illustrated in FIG. 5. The surface number 25 represents the second optical system 30.

"Shift" in Table 1 means an eccentric, shifted amount in the y-direction. "Tilt" in Table 1 means an eccentric, tilted amount when tilted on the X-axis as a rotary shaft. Units in Table 1 for each of the curvature radius, surface distance and eccentric shifted amount are mm. Further, the + (plus) and − (minus) signs of the shifted amount show that the upward shift in FIG. 2 is represented by a sign + (plus) and the downward shift is represented by a sign − (minus). Further, as to the tilt signs, the leftward rotation about the X-axis is represented by the + sign, and the rightward rotation of the tilt about the X-axis is represented by the − sign. The inclination angle of the reflection surface of the second optical system 30 relative to the Y-axis is −39.07°.

The aspheric surfaces of the surface numbers 3, 4, and 20 to 23 in Table 1 are rotationally symmetric aspheric surfaces but may be asymmetric aspheric surfaces. The rotationally symmetric aspheric surface is represented by the following known aspheric surface formula: $Z=c*r^2/[1+\sqrt{1-(1+k)c^2*r^2}]+A*r^4+B*r^6+C*r^8\ldots$, wherein Z is a depth in the optical axis direction, c is paraxial curvature radius, r is a distance from the optical axis in the direction perpendicular to the optical axis, k is a circular cone coefficient, and A, B, C, . . . are higher order coefficients. The shape is specified by giving specific values to k, A, B, C, and the like.

$Z=c*r2/[1+\sqrt{1-(1+k)c2*r2}]+A*r4+B*r6+C*r8\ldots$, in which Z is a depth in the optical axis direction, c is paraxial curvature radius, r is a distance from the optical axis in the direction perpendicular to the optical axis, k is a circular cone coefficient, and A, B, C, . . . are higher order coefficients. The shape is specified by giving specific values to k, A, B, C, and the like. Thus, by using an aspheric surface lens for the first optical system 20, design flexibility is enhanced and precision of focusing on the screen is improved. Table 2 shows respective values of coefficients in the above formula according to the present embodiment.

TABLE 2

| Surface Number | 3 | 4 | 20 | 21 | 22 | 23 |
|---|---|---|---|---|---|---|
| $4^{th}$ coefficient (A) | 3.62E−05 | 5.00E−05 | 3.44E−05 | −1.91E−05 | −1.21E−04 | −7.85E−05 |
| $6^{th}$ coefficient (B) | 1.98E−08 | −4.93E−10 | 2.96E−06 | 6.56E−07 | −3.69E−07 | −5.50E−07 |
| $8^{th}$ coefficient (C) | 5.78E−10 | −2.60E−11 | −1.17E−07 | −1.89E−08 | 6.52E−09 | 1.22E−08 |
| $10^{th}$ coefficient (E) | −3.74E−13 | 2.73E−11 | 2.34E−09 | 1.74E−10 | 2.73E−12 | −1.32E−10 |

TABLE 2-continued

| Surface Number | 3 | 4 | 20 | 21 | 22 | 23 |
|---|---|---|---|---|---|---|
| 12$^{th}$ coefficient (E) | 3.54E−14 | −6.18E−13 | −2.79E−11 | −1.22E−12 | −2.16E−14 | 1.12E−12 |
| 14$^{th}$ coefficient (F) | −1.05E−15 | 5.36E−15 | 1.61E−13 | −2.05E−15 | −4.61E−16 | −4.56E−15 |
| 16$^{th}$ coefficient (G) | 8.48E−18 | −1.50E−17 | −3.68E−16 | 1.87E−17 | 1.43E−18 | 6.82E−18 |

The reflection surface (surface number 25) of the second optical system 30 has an anamorphic polynomial free-form shape according to the present embodiment. When the reflection mirror with positive power of the second optical system 30 has an anamorphic polynomial free-form shape, the curved surface shape of the reflection surface may be adjusted at each reflection area with respect to each image height, thereby improving the aberration correction performance. Table 3 shows values for each coefficient in the polynomial free-form formula $$Z = X2xx^2 + Y2xy^2 + X2Yxx^2y + Y3xy^3 + X4xx^4 + X2Y2 \times x^2y^2 + Y4xy^4 + X4Yxx^4y + X2Y3xx^2y^3 + Y5xy^5 + X6 \times x^6 + X4Y2xx^4y^2 + X2Y4xx^2y^4 + Y6xy^6 + \ldots$$

according to the present embodiment.

TABLE 3

| Coefficient | Value |
|---|---|
| X2 | −3.8E−03 |
| Y2 | 1.51E−03 |
| X2Y | −1.32E−04 |
| Y3 | −3.62E−05 |
| X4 | 1.74E−07 |
| X2Y2 | −2.15E−06 |
| Y4 | −2.16E−07 |
| X4Y | 1.06E−08 |
| X2Y3 | −4.77E−08 |
| Y5 | −1.42E−08 |
| X6 | −3.28E−10 |
| X4Y2 | 2.55E−10 |
| X2Y4 | −1.45E−09 |
| Y6 | −1.57E−09 |
| X6Y | −2.23E−11 |
| X4Y3 | 1.40E−11 |
| X2Y5 | −6.8E−11 |
| Y7 | −1.37E−11 |
| X8 | 3.21E−13 |
| X6Y2 | −4.96E−13 |
| X4Y4 | 1.69E−12 |
| X2Y6 | −1.63E−12 |
| Y8 | 3.86E−12 |
| X8Y | 2.15E−14 |
| X6Y3 | −3.34E−14 |
| X4Y5 | 8.94E−14 |
| X2Y7 | 7.03E−14 |
| Y9 | 3.22E−14 |
| X10 | −1.86E−16 |
| X8Y2 | 5.21E−16 |
| X6Y4 | −1.24E−15 |
| X4Y6 | 4.71E−16 |
| X2Y8 | 4.08E−15 |
| Y10 | −5.40E−15 |
| X10Y | −9.23E−18 |
| X8Y3 | 2.03E−17 |
| X6Y5 | −4.37E−17 |
| X4Y7 | −2.10E−17 |
| X2Y9 | −6.56E−17 |
| Y11 | −1.45E−17 |
| X12 | −4.84E−20 |
| X10Y2 | −2.34E−19 |
| X8Y4 | 1.94E−19 |
| X6Y6 | 7.69E−19 |
| X4Y8 | −2.84E−18 |
| X2Y10 | −1.14E−18 |
| Y12 | 2.30E−18 |

Next, a description will be given of the resolution according to the present embodiment.

Figure 9:
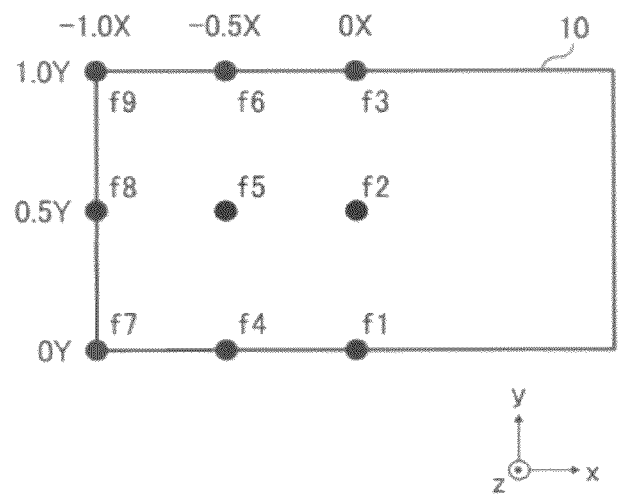
FIG. 9 is a view illustrating positions of light fluxes f1 to f9 in the image generating unit for the purpose of evaluating resolution.

FIG. 9 is a view defining a position of the light in the image generating unit 10 for evaluating resolution.

As illustrated in FIG. 9, a center position in the x-direction in the x-y plane of the image generating unit 10 is set as a base position in the x-axis direction, and a left side position from the base position is − (minus), and a right side position is + (plus). In addition, the bottom end position in the x-y plane is set as a base position in the y-axis direction, and a lower side position from the base position is − (minus) and an upper side position from the base position is + (plus). Then, as to an area satisfying x≤0 of the image generating unit 10, nine lattice points f1 to f9 are obtained as evaluation points to evaluate the resolution, by dividing in the x- and y-directions each into three. As illustrated in FIG. 1, because the projected image plane (or the projection surface 101) is on the x-y plane and the spot characteristics on the projected image plane are symmetrical in ±x-directions, the resolution is evaluated as to the x≤0 area only.

Figure 10:
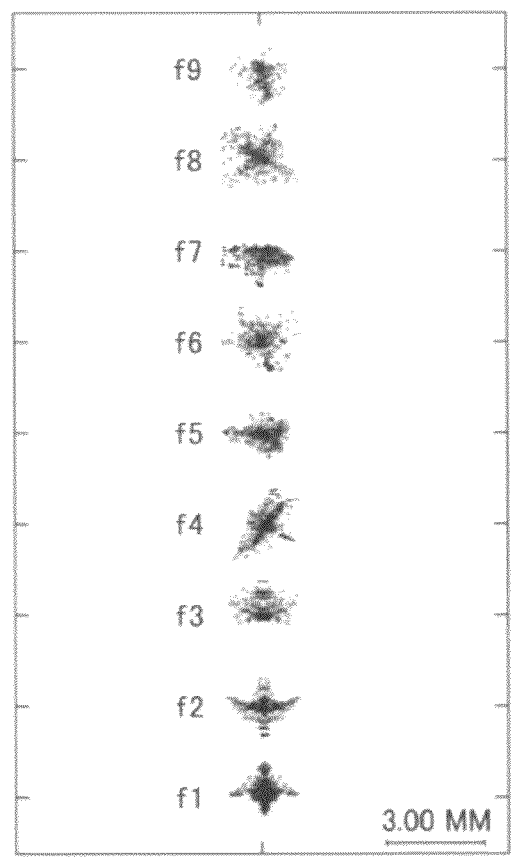
FIG. 10 is a view illustrating a spot diagram projected onto the projection surface of each position f1 to f9.

FIG. 10 is a view illustrating a spot diagram projected onto the projection surface 101 of each lattice point f1 to f9. As illustrated in FIG. 10, it can be seen that the spot of each evaluation point of from f1 to f9 is optimally focused. Specifically, in the present embodiment, Widescreen Extended Graphics Array- (WXGA-) class resolution is obtained. In the resolution frequency of the WXGA class, at least 50% performance is obtained over an entire area of the screen as white color modulation transfer function (MTF).

Figure 11:
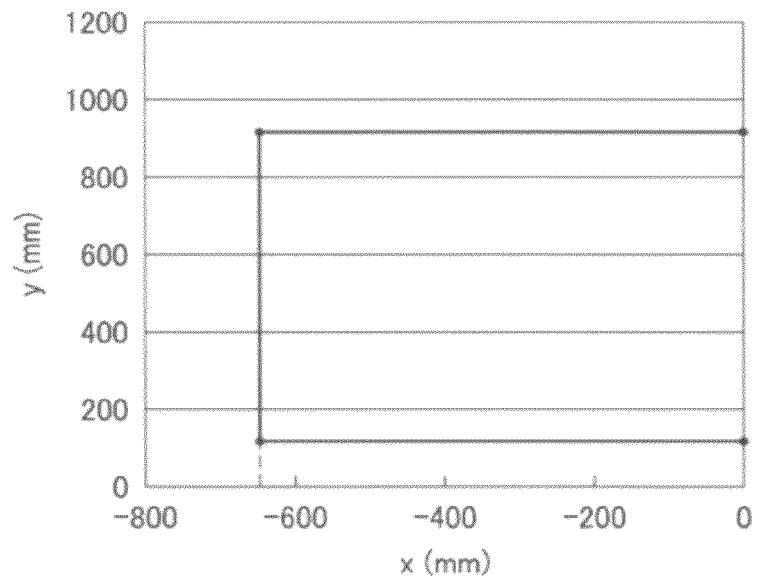
FIG. 11 is a graph in which coordinates of f1, f3, f7, and f9 in the projected image are plotted.

Table 4 below shows coordinates of f1, f3, f7, and f9 in each of the image generating unit 10 and the projected image and FIG. 11 shows the plotted coordinates of f1, f3, f7, and f9 in the projected image. FIG. 11 shows that an image without distortion can be obtained.

TABLE 4

| | Image Generating Unit | | Projected Image | |
|---|---|---|---|---|
| | x | y | x | y |
| f1 | 0 | 0 | 0 | 125.00 |
| f3 | 0 | 8.64 | 0 | 921 |
| f7 | −6.92 | 0 | −646.97 | 115.714 |
| f9 | −6.92 | 8.64 | −642.25 | 914.064 |

Table 5 below shows various elements when the second optical system 30 is rotated and the tilt angle of the reflection surface of the second optical system 20 relative to the Y-axis is set to be −39.47°.

TABLE 5

| Surface Number | Surface Shape | Curvature Radius | Distance between Surfaces | Refraction Index | Dispersion | Shift | Tilt |
|---|---|---|---|---|---|---|---|
| 0 | Spheric | ∞ | 1.11 | | | | |
| 1 | Spheric | ∞ | 1.05 | 1.51 | 63.35 | | |
| 2 | Spheric | ∞ | 39.97 | | | | |
| 3 | Aspheric | 20.05 | 3.92 | 1.51 | 63.90 | −1.39 | |
| 4 | Aspheric | −58.99 | 0.10 | | | | |
| 5 | Spheric | ∞ | 0.10 | | | | |
| 6 | Spheric | 36.73 | 1.00 | 1.84 | 40.59 | | |
| 7 | Spheric | 11.27 | 6.28 | 1.49 | 69.98 | | |
| 8 | Spheric | −23.49 | 0.10 | | | | |
| 9 | Spheric | −88.06 | 7.00 | 1.84 | 35.72 | | |
| 10 | Spheric | 44.82 | 0.10 | | | | |
| 11 | Spheric | 21.80 | 6.00 | 1.57 | 41.56 | | |
| 12 | Spheric | −13.95 | 1.00 | 1.84 | 42.98 | | |
| 13 | Spheric | −107.29 | ○ 0.13 | | | | |
| 14 | Spheric | 131.27 | 2.28 | 1.72 | 52.53 | | |
| 15 | Spheric | 58.01 | ○ 0.17 | | | | |
| 16 | Spheric | 30.90 | 4.73 | 1.70 | 29.04 | | |
| 17 | Spheric | −26.63 | 1.62 | | | | |
| 18 | Spheric | −24.77 | 7.00 | 1.84 | 32.80 | | |
| 19 | Spheric | 28.19 | 4.07 | | | | |
| 20 | Aspheric | −17.22 | 1.60 | 1.53 | 55.80 | | |
| 21 | Aspheric | −22.10 | ○ 8.68 | | | | |
| 22 | Aspheric | −46.46 | 2.70 | 1.53 | 55.80 | | |
| 23 | Aspheric | −26.53 | ○ 0.30 | | | | |
| 24 | Spheric | ∞ | 90.00 | | | | |
| 25 | xy-polynomial surface | −81.45 | −371.94 | reflection | | −31.85 | −39.47 |
| 26 | Spheric | ∞ | 0.00 | | | | |

As above, when the second optical system 30 is further tilted, the projected image further shifts to +y-direction. In this case, as explained heretofore referring to FIG. 5, the resolution is maintained by shifting the first group of the first optical system 20 to −Z-direction, the second group thereof to +Z-direction, and the third group thereof to −Z-direction. As shown in Table 5 indicated by a mark ○, because the third group of the first optical system 20 shifts in the −Z-direction, a distance between the surface numbers 13 and 14 becomes 0.13 mm and the distance is shortened by 0.03 mm. It is noted that the surface number 13 is the emission plane of the extreme downstream lens of the fourth group of the first optical system 20 in the light advancing direction and the surface number 14 is the incidence plane of the extreme upstream lens of the third group of the first optical system 20 in the light advancing direction.

Similarly, because the second group of the first optical system 20 shifts in the +Z-direction, a distance between the surface numbers 15 and 16 becomes 0.17 mm and the distance is expanded by 0.07 mm. Herein, the surface number 15 is the emission plane of the extreme downstream lens of the third group of the first optical system 20 in the light advancing direction and the surface number 16 is the light incidence surface of the extreme upstream lens of the second group of the first optical system 20 in the light advancing direction. Further, because the first group of the first optical system 20 shifts in the −Z-direction, a distance between the surface numbers 21 and 22 becomes 8.68 mm so that the distance is shortened by 0.15 mm. The surface number 21 is the emission plane of the extreme downstream lens of the second group of the first optical system 20 in the light advancing direction and the surface number 22 is the light incidence surface of the extreme upstream lens of the first group of the first optical system 20 in the light advancing direction. Furthermore, a distance between the surface number 23 (i.e., the emission surface of the extreme downstream lens of the first group of first optical system 20 in the light advancing direction) and the surface number 24 being a dummy surface becomes 0.30 mm, so that the distance is expanded by 0.1 mm.

Figure 12:
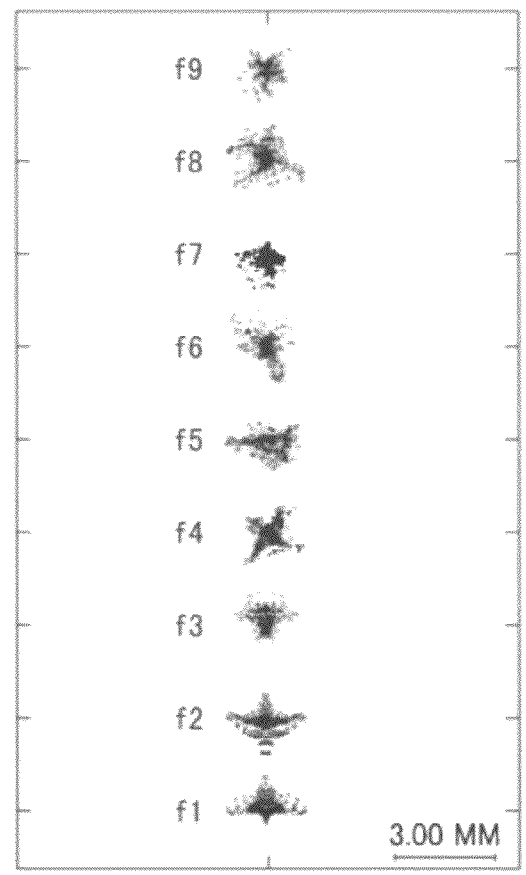
FIG. 12 is a view illustrating a spot diagram projected onto the projection surface of each light f1 to f9 when a tilt angle of the second optical system is set at −39.47°.

FIG. 12 is a view illustrating a spot diagram projected onto the projection surface 101 of each lattice point f1 to f9 when the second optical system 30 is rotated so as to have an inclined angle of −39.47° with respect to the Y-axis of the reflection surface of the second optical system 30.

As illustrated in FIG. 12, it is understood that an optimal focusing can be achieved by shifting each of the first to third groups of the first optical system 20. In the resolution frequency of the WXGA class, at least 50% performance is obtained over an entire area of the screen as white color modulation transfer function (MTF).

Figure 13:
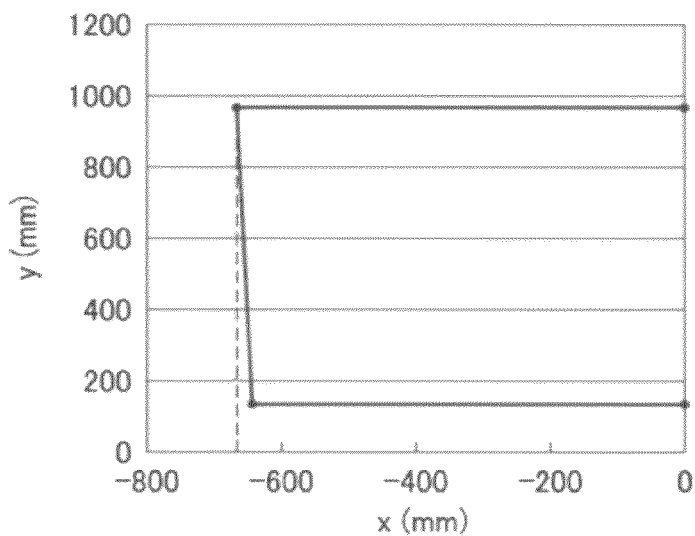
FIG. 13 is a graph in which coordinates of f1, f3, f7, and f9 in the projected image are plotted when the tilt angle of the second optical system is set at −39.47°.

Table 6 below shows coordinates of f1, f3, f7, and f9 in each of the image generating unit 10 and the projected image when the second optical system 30 is rotated to have an inclined angle of −39.47° with respect to the Y-axis of the reflection surface of the second optical system 30. FIG. 13 shows the plotted coordinates of f1, f3, f7, and f9 in the projected image.

As observed by comparing with FIG. 11, the upper end of the projected image is shifted in the +y-direction in FIG. 13. As illustrated in FIG. 13, however, it is observed that there is an increased trapezoidal distortion. Further, it is observed from FIGS. 11 and 13 that the image expands in the y-direction.

TABLE 6

| | Image Generating Unit | | Projected Image | |
|---|---|---|---|---|
| | x | y | x | y |
| f1 | 0 | 0 | 0 | 134.759 |
| f3 | 0 | 8.64 | 0 | 968.59 |

TABLE 6-continued

| | Image Generating Unit | | Projected Image | |
|---|---|---|---|---|
| | x | y | x | y |
| f7 | −6.92 | 0 | −647.054 | 131.131 |
| f9 | −6.92 | 8.64 | −662.602 | 967.208 |

Accordingly, as described above, certain pixels are thinned from the image data so that the distortion in the projected image as illustrated in FIG. 13 is to be corrected. When the thinning of the pixels in the x-direction is performed to correct the length of the projected image in the y-direction, setting the upstream end (or the bottom end in the present embodiment) in the shifting direction of the projected image of the image data as the base position is denoted as case 1. Alternatively, setting the downstream end (or the upper end in the present embodiment) in the shifting direction of the projected image of the image data as the base position is denoted as case 2. Further, in the present embodiment, the magnification ratio of 94× should be maintained in both cases 1 and 2.

Figure 14:
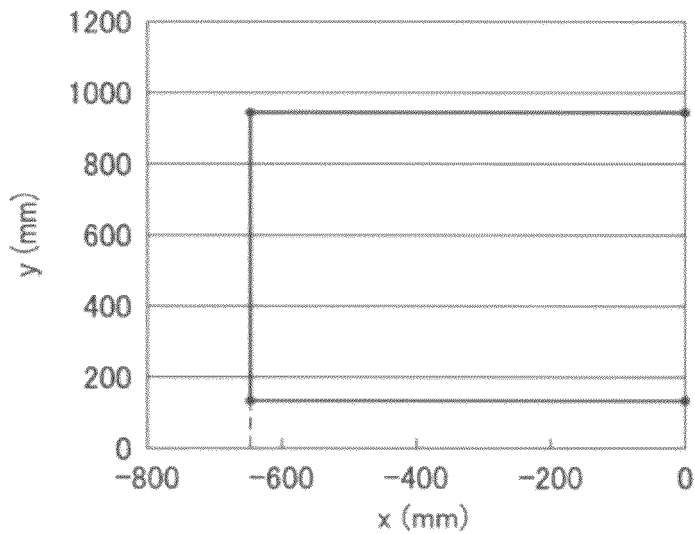
FIG. 14 is a graph in which coordinates of f1', f3', f7', and f9' in the projected image are plotted when correction of case 1 is performed.

Table 7 below shows coordinates of f1', f3', f7', and f9' in each of the image generating unit and the projected image when the correction in case 1 is performed. FIG. 14 shows the plotted coordinates of f1', f3', f7', and f9' in the projected image.

TABLE 7

| | Image Generating Unit | | Projected Image | |
|---|---|---|---|---|
| | x | y | x | y |
| f1' | 0 | 0 | 0 | 134.76 |
| f3' | 0 | 8.4 | 0 | 943.896 |
| f7' | −6.92 | 0 | −647.054 | 131.131 |
| f9' | −6.75 | 8.4 | −646.926 | 944.805 |

As observed from Tables 6 and 7, in case 1, thinning operation in the x-direction is performed with the base position set at the upstream end (the bottom end in the present embodiment) in the shifting direction of the projected image of the image data. Therefore, the positions of f1' and f7' of the image generating unit 10 in the y-direction is the same as those of f1 and f7 before correction as shown in Table 6. On the other hand, f3' and f9' disposed upstream of the y-direction shift downward than the positions of f3 and f9 in Table 6 because the image processor 53 thins a plurality of pixels of image data in the x-direction.

In addition, because several pixels are thinned from the plurality of pixels remaining in the x-direction without being thinned, based on each position in the y-direction after correction and the predetermined algorithm, f9' shifts to the x-direction inwardly from the position of f9.

Accordingly, certain pixels are thinned from the image data so that an image without distortion can be obtained while the projected image being shifted in the +y-direction as illustrated in FIG. 14.

Figure 15:
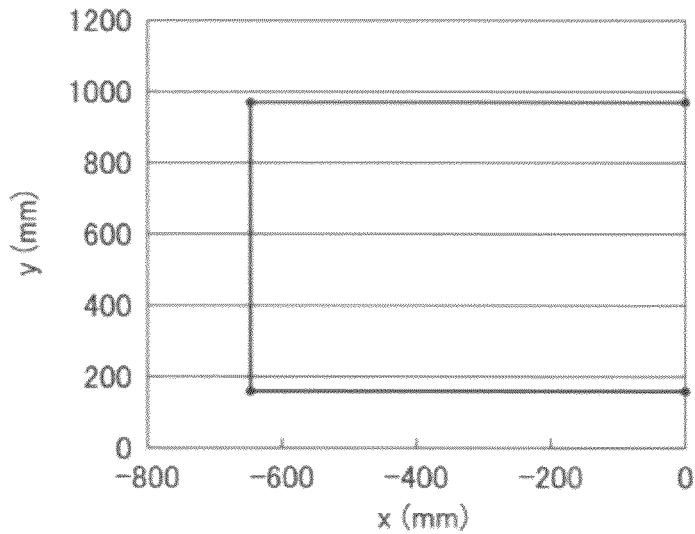
FIG. 15 is a graph in which coordinates of f1', f3', f7', and f9' in the projected image are plotted when correction of case 2 is performed.

Table 8 below shows coordinates of f1', f3', f7', and f9' in each of the image generating unit and the projected image when the correction in case 2 is performed. FIG. 15 shows the plotted coordinates of f1', f3', f7', and f9' in the projected image when the correction in case 2 is performed.

TABLE 8

| | Image Generating Unit | | Projected Image | |
|---|---|---|---|---|
| | x | y | x | y |
| f1' | 0 | 0.29 | 0 | 161.725 |
| f3' | 0 | 8.64 | 0 | 968.59 |
| f7' | −6.92 | 0.29 | −647.134 | 158.44 |
| f9' | −6.75 | 8.64 | −646.514 | 967.728 |

As observed from Tables 6 and 8, in case 2, thinning operation in the x-direction is performed with the base position set at the downstream end (the upper end in the present embodiment) in the shifting direction of the projected image of the image data. Therefore, the positions of f1' and f7' of the image generating unit 10 in the y-direction shift upwards than those of f1 and f7 as shown in Table 6 because the image processor 53 thins a plurality of pixels of image data in the x-direction. In addition, similarly to case 1, several pixels are thinned from the plurality of pixels remaining in the x-direction without being thinned, based on each position in the y-direction after correction and the predetermined algorithm, whereby f9' shifts to the x-direction inwardly from the position of f9.

Accordingly, the certain pixels are thinned from the image data so that an image without distortion can be obtained while the projected image being shifted in the +y-direction as illustrated in FIG. 15.

In the cases 1 and 2, because the distortion in the projected image is corrected by thinning pixels from the image data, the resolution of the projected image is degraded.

Table 9 below shows a resolution after image processing and a shifted amount when the correction in the cases 1 and 2 are performed. The resolution after image processing represents an area ratio of the usage area of the image generating unit 10 before and after the image processing. When the image processing is not performed, the effective area of the image generating unit 10 is $6.92*8.64*2≈120$ mm$^2$. The resolution after image processing in case 1 becomes $(115/2)*100=96\%$.

TABLE 9

| | Case 1 | Case 2 |
|---|---|---|
| Area | 115 | 114 |
| Resolution after image processing (%) | 96 | 95 |
| Image shift amount (mm) | 10 | 37 |

In case 1, the pixels of the image data are thinned to turn the image generated by the image generating unit 10 into the trapezoidal shape as illustrated in FIG. 7A so that the area of the image generated by the image generating unit 10 is lessened than the case of using an entire area of the image generating unit 10 without thinning the image data as illustrated in FIG. 6A. In case 2, the image that the image generating unit 10 generates is turned into a trapezoidal shape as illustrated in FIG. 8A so that the area of the image is lessened than the case of using an entire area of the image generating unit 10 without thinning the image data as illustrated in FIG. 6A. Accordingly, the resolution is degraded by this area ratio. Accordingly, by ascertaining the area ratio of the usage area of the image generating unit 10 before and after the image processing, the degradation of the resolution can be ascertained.

As observed from Table 9, the correction of case 1 can more optimally prevent the degradation of the resolution compared to case 2. The correction of case 2 can increase the image shifting amount compared to case 1.

Next, by further rotating the second optical system 30, the tilt angle of the reflection surface of the second optical system 30 with respect to the Y-axis is made to be −39.87° will be described.

Table 10 below shows various elements when the second optical system 30 is rotated and the tilt angle of the reflection surface of the second optical system 30 with respect to the Y-axis is made to be −39.87°.

TABLE 10

| Surface Number | Surface Shape | Curvature Radius | Distance between Surfaces | Refraction Index | Dispersion | Shift | Tilt |
|---|---|---|---|---|---|---|---|
| 0 | Spheric | ∞ | 1.11 | | | | |
| 1 | Spheric | ∞ | 1.05 | 1.51 | 63.35 | | |
| 2 | Spheric | ∞ | 39.97 | | | | |
| 3 | Aspheric | 20.05 | 3.92 | 1.51 | 63.90 | −1.39 | |
| 4 | Aspheric | −58.99 | 0.10 | | | | |
| 5 | Spheric | ∞ | 0.10 | | | | |
| 6 | Spheric | 36.73 | 1.00 | 1.84 | 40.59 | | |
| 7 | Spheric | 11.27 | 6.28 | 1.49 | 69.98 | | |
| 8 | Spheric | −23.49 | 0.10 | | | | |
| 9 | Spheric | −88.06 | 7.00 | 1.84 | 35.72 | | |
| 10 | Spheric | 44.82 | 0.10 | | | | |
| 11 | Spheric | 21.80 | 6.00 | 1.57 | 41.56 | | |
| 12 | Spheric | −13.95 | 1.00 | 1.84 | 42.98 | | |
| 13 | Spheric | −107.29 | ○ 0.10 | | | | |
| 14 | Spheric | 131.27 | 2.28 | 1.72 | 52.53 | | |
| 15 | Spheric | 58.01 | ○ 0.23 | | | | |
| 16 | Spheric | 30.90 | 4.73 | 1.70 | 29.04 | | |
| 17 | Spheric | −26.63 | 1.62 | | | | |
| 18 | Spheric | −24.77 | 7.00 | 1.84 | 32.80 | | |
| 19 | Spheric | 28.19 | 4.07 | | | | |
| 20 | Aspheric | −17.22 | 1.60 | 1.53 | 55.80 | | |
| 21 | Aspheric | −22.10 | ○ 8.54 | | | | |
| 22 | Aspheric | −46.46 | 2.70 | 1.53 | 55.80 | | |
| 23 | Aspheric | −26.53 | ○ 0.41 | | | | |
| 24 | Spheric | ∞ | 90.00 | | | | |
| 25 | xy-polynomial surface | −81.45 | −369.28 | reflection | | −31.53 | −39.87 |
| 26 | Spheric | ∞ | 0.00 | | | | |

See the column of distance between surfaces indicated by marks ○ in Table 10. The values of the surface numbers 13, 15, 21, and 23 in Table 10 change compared to the values of the same surface numbers of Table 5. This is because the second optical system 30 is further inclined and the projected image is further shifted to the +y-direction, the first group of the first optical system 20 is further shifted to −z-direction, the second group thereof to +z-direction, and the third group thereof to −z-direction, thereby maintaining the optimal focusing.

Figure 16:
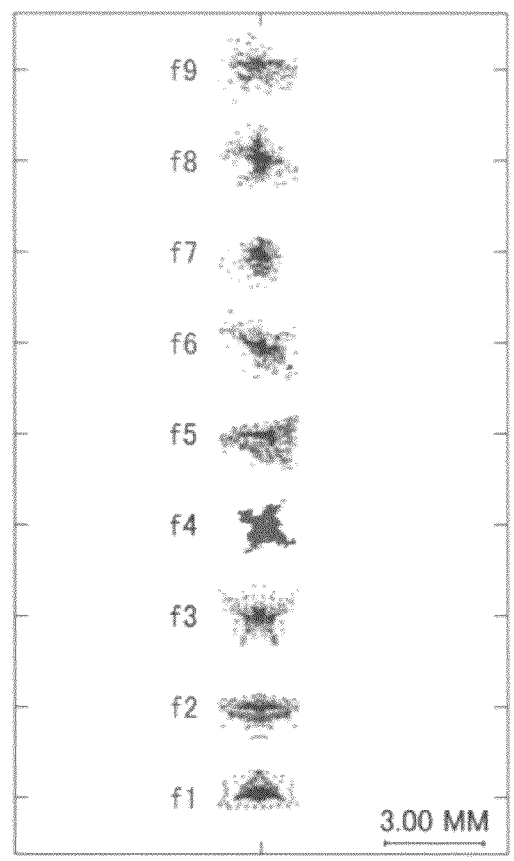
FIG. 16 is a view illustrating a spot diagram projected onto the projection surface of each light f1 to f9 when the tilt angle of the second optical system is set at −39.87°.

FIG. 16 is a view illustrating a spot diagram projected onto the projection surface 101 of each lattice point f1 to f9 when the second optical system 30 is rotated so as to have an inclined angle of −39.47° with respect to the Y-axis of the reflection surface of the second optical system 30.

As illustrated in FIG. 16, it can be seen that optimal focusing can be achieved by shifting each of the first to third groups of the first optical system 20. In the resolution frequency of the WXGA class, at least 50% performance is obtained over an entire area of the screen as white color modulation transfer function (MTF).

Figure 17:
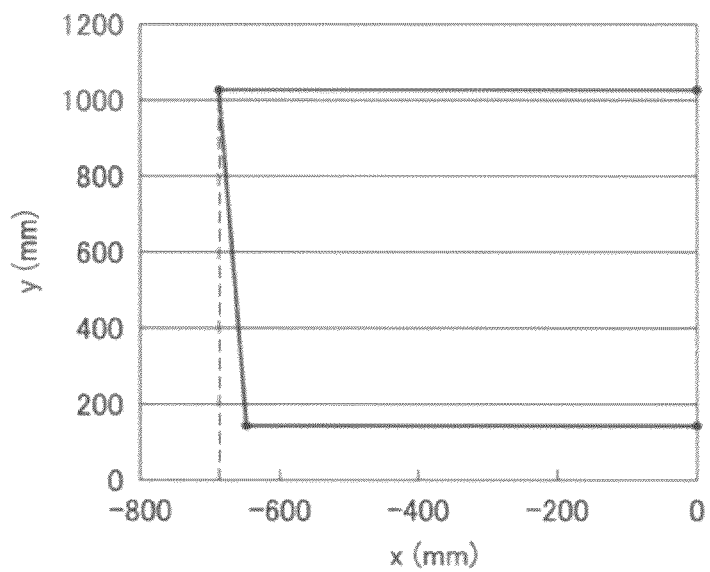
FIG. 17 is a graph in which coordinates of f1, f3, f7, and f9 in the projected image are plotted when the tilt angle of the second optical system is set at −39.87°.

Table 11 below shows coordinates of f1, f3, f7, and f9 in each of the image generating unit 10 and the projected image when the second optical system 30 is rotated to have an inclined angle of −39.47° with respect to the Y-axis of the reflection surface of the second optical system 30. FIG. 17 shows the plotted coordinates of f1, f3, f7, and f9 in the projected image.

TABLE 11

| | Image Generating Unit | | Projected Image | |
|---|---|---|---|---|
| | x | y | x | y |
| f1 | 0 | 0 | 0 | 145.906 |
| f3 | 0 | 8.64 | 0 | 1023.37 |

TABLE 11-continued

| | Image Generating Unit | | Projected Image | |
|---|---|---|---|---|
| | x | y | x | y |
| f7 | −6.92 | 0 | −647.054 | 148.236 |
| f9 | −6.92 | 8.64 | −685.829 | 1028.66 |

As observed by comparing with FIG. 13, the projected image is shifted upwards in the +y-direction in FIG. 17. As illustrated in FIG. 17, however, it is observed that there is an increased trapezoidal distortion. It is also observed from FIG. 17 that the image further expands in the y-direction.

Figure 18:
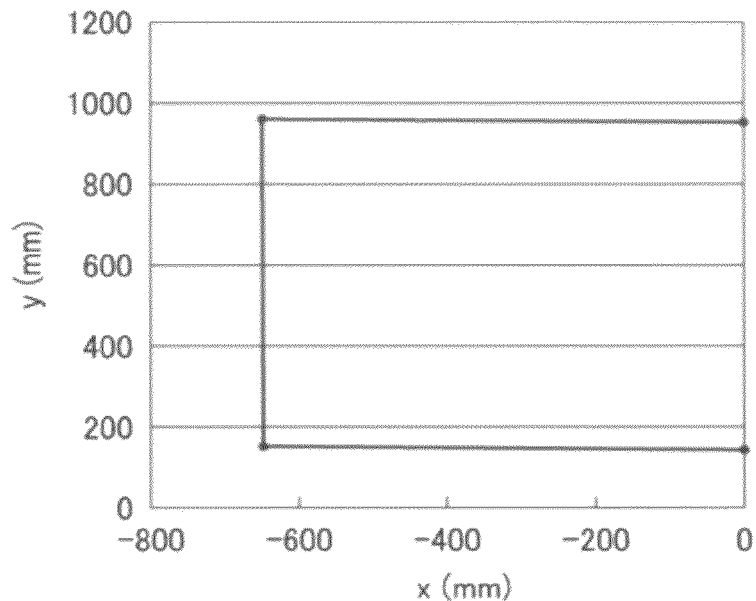
FIG. 18 is a graph in which coordinates of f1', f3', f7', and f9' in the projected image are plotted when the tilt angle of the second optical system is set at −39.87° and the correction of case 1 is performed.

Table 12 below shows coordinates of f1', f3', f7', and f9' in each of the image generating unit and the projected image when the correction in case 1 is performed. FIG. 18 shows the plotted coordinates of f1', f3', f7', and f9' in the projected image.

TABLE 12

| | Image Generating Unit | | Projected Image | |
|---|---|---|---|---|
| | x | y | x | y |
| f1' | 0 | 0 | 0 | 145.91 |
| f3' | 0 | 8.025 | 0 | 953.835 |

TABLE 12-continued

| | Image Generating Unit | | Projected Image | |
|---|---|---|---|---|
| | x | y | x | y |
| f7' | −6.92 | 0 | −647.054 | 148.236 |
| f9' | −6.53 | 8.025 | −646.065 | 963.617 |

As observed from Table 12, by correcting the coordinates of the image generating unit 10, an image without distortion can be obtained. Comparison of Tables 11 and 12 shows that f3' and f9' at an upper end of the y-direction shift downwards than the positions of f3 and f9 in Table 11 because the image processor 53 thins a plurality of pixels of image data in the x-direction. In addition, comparison of Tables 7 and 11 shows that the projected image distorts more and the positions of f3' and f9' shift downwards than the case in which the tilt angle of the second optical system 30 is −39.47° because the thinned number of pixels of the image data in the x-direction is large. Similarly, the shifting amount of f9' in the x-direction is larger compared to the case in which the tilt angle of the second optical system 30 is −39.47°.

Figure 19:
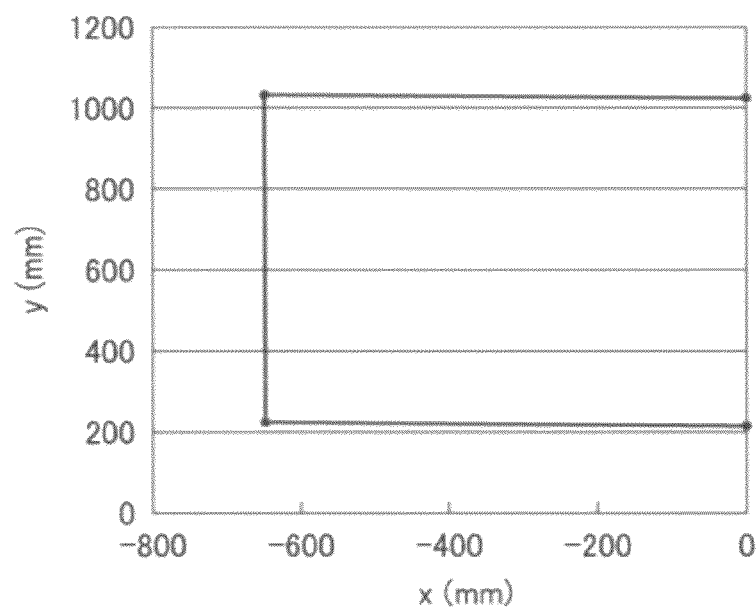
FIG. 19 is a graph in which coordinates of f1', f3', f7', and f9' in the projected image are plotted when the tilt angle of the second optical system is set at −39.87° and the correction of case 2 is performed.

Table 13 below shows coordinates of f1', f3', f7', and f9' in each of the image generating unit and the projected image when the correction in case 2 is performed. FIG. 19 shows the plotted coordinates of f1', f3', f7', and f9' in the projected image when the correction in case 2 is performed.

TABLE 13

| | Image Generating Unit | | Projected Image | |
|---|---|---|---|---|
| | x | y | x | y |
| f1' | 0 | 0.73 | 0 | 216.087 |
| f3' | 0 | 8.64 | 0 | 1023.37 |
| f7' | −6.895 | 0.73 | −646.04 | 216.737 |
| f9' | −6.52 | 8.64 | −646.466 | 1029.15 |

As can be observed from Table 13, by correcting the coordinates of the image generating unit 10, an image without distortion can be obtained as illustrated in FIG. 18. In addition, comparison of Tables 8 and 13 shows that the positions of f3' and f9' shift upwards than the case in which the tilt angle of the second optical system 30 is −39.47°. Further, the shifting amount of f' in the x-direction is larger compared to the case in which the tilt angle of the second optical system 30 is −39.47°. Furthermore, because a plurality of pixels of the image data in the x-direction at the y-direction bottom end are thinned, the position of f7' is shifted inward in the x-direction than the position of f7 before correcting the image data in Table 11.

Table 14 below shows a resolution after image processing and a shifted amount when the correction in the cases 1 and 2 are performed when the tilt angle of the second optical system 30 is −39.87°.

TABLE 14

| | Case 1 | Case 2 |
|---|---|---|
| Area | 108 | 106 |
| Resolution after image processing (%) | 90 | 89 |
| Image shift amount (mm) | 21 | 91 |

As can be observed from Table 14, the correction of case 1 can better prevent the degradation of the resolution compared to case 2. The correction of case 2 can increase the image shifting amount compared to case 1. In addition, comparison of Tables 9 and 14 shows that the projected image distorts more and the resolution is degraded than the case in which the tilt angle of the second optical system 30 is −39.47° because the thinned number of pixels of the image data is large.

The present invention provides an image projection apparatus such as a projector 1 including an optical image generating unit 10 to generate an optical image based on the image data, and a projection optical system (i.e., the first optical system 20 and the second optical system 30 in the present embodiment) including a plurality of optical elements and configured to project an image onto a projection surface coupled with the optical image formed by the optical image generating unit 10. The projector 1 further includes a projected image shifting unit (formed by the gear 41 and the motor 42) to shift the projected image by changing the posture of one of the optical parts that form the projection optical system (i.e., the second optical system 30 in the present embodiment). The projector 1 further includes a tilt sensor 55 configured to detect a posture of the optical parts that change the posture by the projected image shifting unit, and an image processor 53 to perform correction of the optical image that the optical image generating unit generates, based on the detection result of the tilt sensor 55, so as to prevent a trapezoidal distortion of the projected image. With such a structure, the trapezoidal distortion can be optimally corrected without providing any trapezoidal distortion correction device including optical elements and shifting device to shift the optical elements, thereby decreasing the number of parts used for manufacturing the apparatus. As a result, the number of parts employed in the apparatus is reduced, a space for the apparatus can be saved, and the cost of manufacturing the apparatus can be reduced.

Additional modifications and variations of the present invention are possible in light of the above teachings. It is therefore to be understood that, within the scope of the appended claims, the invention may be practiced other than as specifically described herein.

What is claimed is:

1. An image projection apparatus, comprising:
   an optical image generating unit to generate an optical image based on image data;
   a projection surface;
   a projection optical system including a plurality of optical elements and configured to project an image onto a projection surface, the projected image being coupled with the optical image generated by the optical image generating unit;
   a projected image shifting unit to shift the projected image by changing a posture of at least one of the plurality of optical elements included in the projection optical system;
   a tilt sensor to detect a posture of the optical element of which posture is changed by the projected image shifting unit; and
   a trapezoidal distortion correction unit to correct the optical image generated by the optical image generating unit so as to prevent the trapezoidal distortion of the projected image from occurring based on the detection result of the tilt sensor,
   wherein:
   the projection optical system includes a first optical system and a second optical system,
   the first optical system configured to generate an intermediate optical image coupled with the optical image generated by the optical image generating unit, the second optical system configured to project an image coupled with the intermediate optical image onto the projection surface, the tilt sensor changes the posture of the second optical system, the image projection apparatus further comprises a focus adjustment unit, and the first optical system comprises a plurality of optical elements and the focusing adjustment unit adjusts the focusing of the image by shifting at least one of the optical elements included in the first optical system.

2. The image projection apparatus as claimed in claim 1, wherein the trapezoidal distortion correction unit is configured to correct the image data to prevent the trapezoidal distortion of the projected image from occurring.

3. The image projection apparatus as claimed in claim 1, wherein the trapezoidal distortion correction unit is configured to correct the distortion of the projected image in the image shifting direction with a downstream end of the projected image in the image shifting direction set as a base position.

4. The image projection apparatus as claimed in claim 2, wherein the trapezoidal distortion correction unit is configured to correct the distortion of the projected image in the image shifting direction with the upstream end of the projected image in the image shifting direction set as a base position.

5. The image projection apparatus as claimed in claim 1, wherein the second optical system comprises a concave surface mirror having a free-form surface.

6. The image projection apparatus as claimed in claim 1, wherein the optical image generating unit comprises an image forming unit to generate an image in accordance with modulated signals and a light source to irradiate the image forming unit.

* * * * *